(12) United States Patent
Chandhoke

(10) Patent No.: US 9,304,810 B2
(45) Date of Patent: Apr. 5, 2016

(54) TIME MONITORING IN A PROCESSING ELEMENT AND USE

(71) Applicant: NATIONAL INSTRUMENTS CORPORATION, Austin, TX (US)

(72) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 318 days.

(21) Appl. No.: 14/011,366

(22) Filed: Aug. 27, 2013

(65) Prior Publication Data
US 2014/0109096 A1 Apr. 17, 2014

Related U.S. Application Data

(60) Provisional application No. 61/714,006, filed on Oct. 15, 2012.

(51) Int. Cl.
G06F 9/455 (2006.01)
G06F 1/12 (2006.01)
G06F 9/48 (2006.01)

(52) U.S. Cl.
CPC ........ *G06F 9/485* (2013.01); *G06F 1/12* (2013.01); *G06F 9/4825* (2013.01)

(58) Field of Classification Search
None
See application file for complete search history.

(56) References Cited

U.S. PATENT DOCUMENTS

| 6,788,924 | B1* | 9/2004 | Knutson | ............... H04B 7/2681 370/311 |
| 2003/0204550 | A1* | 10/2003 | Lutter | ..................... G01S 19/37 718/102 |
| 2012/0210104 | A1* | 8/2012 | Danko | ................ G06F 9/30076 712/229 |
| 2013/0212420 | A1* | 8/2013 | Lawson | ............. G05B 19/4185 713/400 |

* cited by examiner

Primary Examiner — Tammy Lee
(74) Attorney, Agent, or Firm — Meyertons Hood Kivlin Kowert & Goetzel, P.C.; Jeffrey C. Hood; Brian E. Moore

(57) ABSTRACT

System and method for controlling thread execution via time monitoring circuitry in a processing element. Execution of a thread may be suspended via a thread suspend/resume logic block included in the processing element in response to a received suspend thread instruction. An indication of a wakeup time may be received to a time monitoring circuit (TMC) included in the processing element. Time may be monitored via the TMC using a clock included in the processing element, until the wakeup time obtains. The thread suspend/resume logic block included in the processing element may be invoked by the TMC in response to the wakeup time obtaining, thereby resuming execution of the thread.

14 Claims, 14 Drawing Sheets

TIME MONITORING IN A PROCESSING ELEMENT AND USE

PRIORITY DATA

This application claims benefit of priority to U.S. Provisional Application Ser. No. 61/714,006, titled "Time Monitoring in a Processing Element and Use", filed Oct. 15, 2012, whose inventor was Sundeep Chandhoke, which is hereby incorporated by reference in its entirety as though fully and completely set forth herein.

FIELD OF THE INVENTION

The present invention relates to the field of program execution, and more particularly to a system and method for controlling thread execution via time monitoring circuitry in a processing element.

DESCRIPTION OF THE RELATED ART

Software execution is often, and increasingly, performed via execution threads, which may be considered to be the smallest sequence of executable program code or instructions that can be scheduled or managed independently by an operating system (OS) scheduler, and generally perform some specified task. Prior art processing elements, e.g., central processing units (CPUs), do not have a fundamental way of executing threads based on time. Thus, in order to allow software executing on the processing element (or simply "processor", for brevity) to schedule tasks based on time, they utilize a timer which interrupts the processing element. This timer interrupt mechanism is not efficient and introduces unpredictability. Interrupt based scheduling is processor state dependent. An interrupt always incurs at least two context changes for the processor; when an interrupt fires, the current processor context is saved before the interrupt service routine (ISR) is invoked, and after the ISR is exited the context is loaded and execution continues, as illustrated in FIG. 1.

More specifically, as shown in the timeline at the bottom of FIG. 1, first, the timer interrupt fires ("goes off"), and the CPU (processor) invokes the ISR in response. The ISR switches the context of the processor to a scheduler, e.g., the OS scheduler, which begins running (executing). The scheduler then adjusts or sets the timer interrupt for the next wakeup, and the context of the processor is switched to a new (i.e., different) thread, which begins executing, e.g., to perform a task. Additionally, the interrupt may be delayed depending on the state of the processor, such as when, in the case of global time usage (explained in more detail below), the processor is servicing another interrupt when the timer interrupt fires. Furthermore, the processor must save its thread's context before entering into an ISR. The time required for saving the thread's context varies based on what the CPU is executing at the time the interrupt asserted, thus increasing the unpredictability of the latency.

This sequence of actions causes non-repeatable behavior in the timer interrupt, which leads to unpredictability. The demand for higher rates requires increasing the resolution and frequency of the timer interrupt, which significantly increases the overhead in scheduling, since handling the ISR and the context switching uses a significantly higher percentage of the processor cycles for applications that require higher loop rates.

In distributed systems, time is shared by multiple processors (or CPUs) participating on a distributed network, as also shown in FIG. 1, wherein a host computer system 12 is communicatively coupled via a switch to multiple CPU (processor) subsystems comprising or forming a cyber-physical system (CPS), which refers to engineered distributed systems with multiple processors that are built from and depend upon the synergy of coordinated computational and physical components. Note that in the exemplary system shown, each subsystem includes a CPU/processor, a Network Interface Controller (NIC), and multiple I/O ports. Each processor (or CPU) is required to correct (discipline) the timer interrupt so that it can be phase aligned with respect to the other processors in the network. In this case, software executing on the processor has the additional responsibility of running a servo algorithm (e.g., the global time servo shown in FIG. 1) to maintain shared (global) time and periodically correct the processor timer that fires the timer interrupt based on a global time stamp provided by a NIC/endpoint device (e.g., peripheral device), as also shown in FIG. 1. This further exacerbates the overhead experienced in scheduling.

Accordingly, systems and methods for improved execution thread management are desired.

SUMMARY OF THE INVENTION

Various embodiments of a system and method for controlling thread execution via time monitoring circuitry in a processing element are presented below.

In one embodiment, the system for controlling thread execution via time monitoring circuitry in a processing element may include a processing element that may include a clock, a thread suspend/resume logic block, and a time monitor circuit (TMC). The thread suspend/resume logic block may be configured to suspend execution of a thread in response to a received suspend thread instruction. The TMC may be configured to receive an indication of a wakeup time and monitor time via the clock until the wakeup time obtains. The TMC may also be configured to invoke the thread suspend/resume logic block to resume execution of the thread in response to the wakeup time obtaining, e.g., in accordance with the wakeup time. In some embodiments, the indication of the wakeup time may be an absolute time. In other embodiments, the indication of the wakeup time may be a relative time.

In an exemplary embodiment, the TMC may be further configured to discipline the clock via an external time source. In some embodiments, the TMC may be configured to discipline the clock using a global time provided by software. In such embodiments, the system may further include a local reference clock coupled to the processing element and to an external device, e.g., a peripheral device or a network interface (NIC). In certain embodiments, the local reference clock may be connected directly to the processing element and to the external device. The external device, e.g., the peripheral device or the NIC, may be configured to provide the global time to the processing element. To provide the global time, the software may be executable to retrieve a local reference time from the local reference clock that corresponds to the global time and provide the global time and the local reference time to the processing element.

In some embodiments, in order to discipline the clock, the TMC may be configured to retrieve a subsequent local reference time from the local reference clock, e.g., a latched time. The TMC may be further configured to adjust the global time based on a difference between the subsequent local reference time and the local reference time, e.g., the latched time, thereby compensating for latency due to the provision of the global time by the software.

In other embodiments, the external time source may include an external hardware signal, where the external hardware signal may include an epoch and a clock signal. In such embodiments, the external time source may be directly connected to the processor to avoid clock latency.

In certain embodiments a method for controlling thread execution via time monitoring circuitry in a processing element may include receiving an indication of a wakeup time to a time monitoring circuit (TMC) which may be included in a processing element. In some embodiments, the indication of the wakeup time may be an absolute time. In other embodiments, the indication of the wakeup time may be a relative time. In response to a received suspend thread instruction, a thread suspend/resume logic block, which in some embodiments may also be included in the processing element, may suspend execution of a thread. The TMC may monitor time using a clock, which in some embodiments may be included in the processing element, until the wakeup time obtains. In response to the wakeup time obtaining, the TMC may invoke the thread suspend/resume on the suspended thread, thereby resuming execution of the thread. In some embodiments, the method may further include the TMC disciplining the clock via an external time source. In such embodiments, a global time provided by software may be used to perform the disciplining of the clock. In certain embodiments, the method may include providing the global time to the processing element via an external device, e.g., a peripheral device or a network interface (NIC). In such embodiments, a local reference clock may be coupled to the processing element and to the peripheral device. In other embodiments the local reference clock may be connected directly to the processing element and the peripheral device. Additionally, a local reference time may be retrieved, via software, from the local reference clock that corresponds to the global time in order to provide the global time. Further, the disciplining of the clock may include retrieving, via the TMC, a subsequent local reference time from the local reference clock and adjusting, via the TMC, the global time based on a difference between the subsequent local reference time and the local reference time, thereby compensating for latency due to the provision of the global time by software. In certain embodiments, the external time source may include an external hardware signal, where the external hardware signal includes an epoch and a clock signal.

BRIEF DESCRIPTION OF THE DRAWINGS

A better understanding of the present invention can be obtained when the following detailed description of the preferred embodiment is considered in conjunction with the following drawings, in which.

Figure 1:
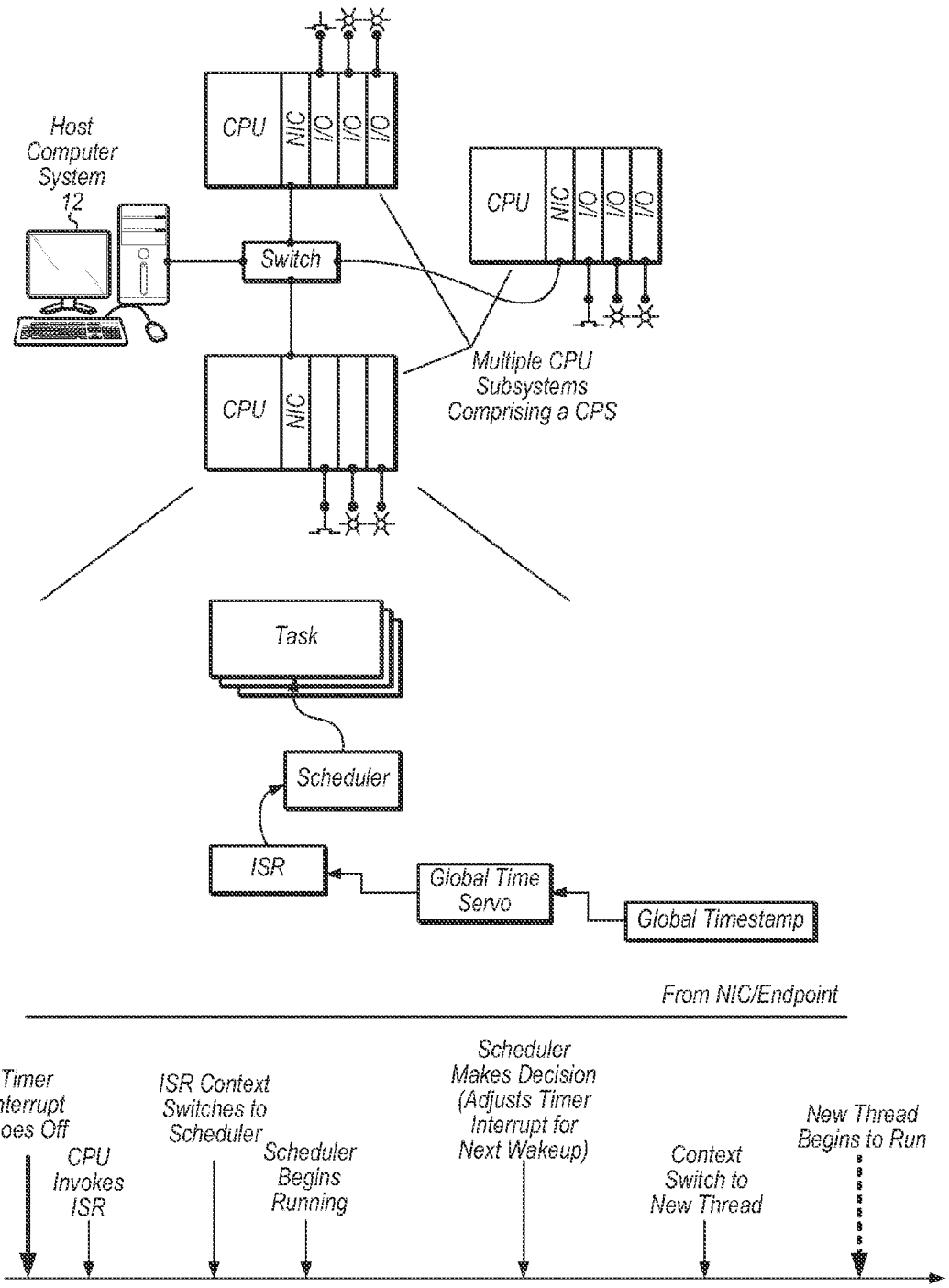
FIG. 1 illustrates interrupt based task scheduling and execution in a distributed system, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional Application Ser. No. 61/714,006, titled "Time Monitoring in a Processing Element and Use", filed Oct. 15, 2012, whose inventor was Sundeep Chandhoke.

U.S. application Ser. No. 13/594,088 titled "Hardware Assisted Real-Time Scheduler Using Memory Monitoring", filed Aug. 24, 2012, whose inventor was Sundeep Chandhoke.

U.S. Pat. No. 7,640,384 titled "Queued Locks Using Monitor-Memory Wait", filed Sep. 20, 2007, whose inventors were Per Hammarlund, James. B. Crossland, Anil Aggarwal, and Shivnandan D. Kaushik.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2A:
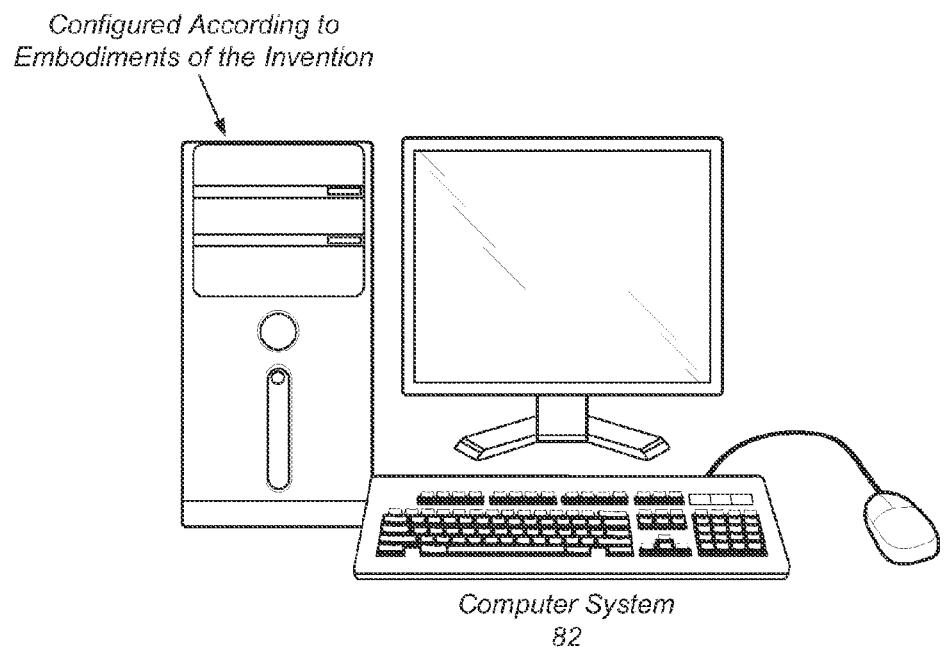
FIG. 2A illustrates a computer system configured to execute a graphical program according to an embodiment of the present invention.

FIG. 2A—Computer System

FIG. 2A illustrates a computer system 82 configured to implement embodiments of the present invention. The computer system may include one or more processing elements, each of which may include one or more processor cores, and a clock. The computer system 82 may further include a thread suspend/resume logic block, configured to suspend execution of a thread in response to a received suspend thread instruction, and a time monitor circuit (TMC), described in more detail below.

As shown in FIG. 2A, in some embodiments, the computer system 82 may include a display device, although in other embodiments, the computer system may have limited or no display capabilities, e.g., may be an embedded system. The computer system 82 may include at least one memory medium on which one or more computer programs or software components may be stored. The memory medium may also store operating system software, as well as other software for operation of the computer system. Various embodiments further include receiving or storing instructions and/or data implemented in accordance with the foregoing description upon a carrier medium.

Figure 2B:
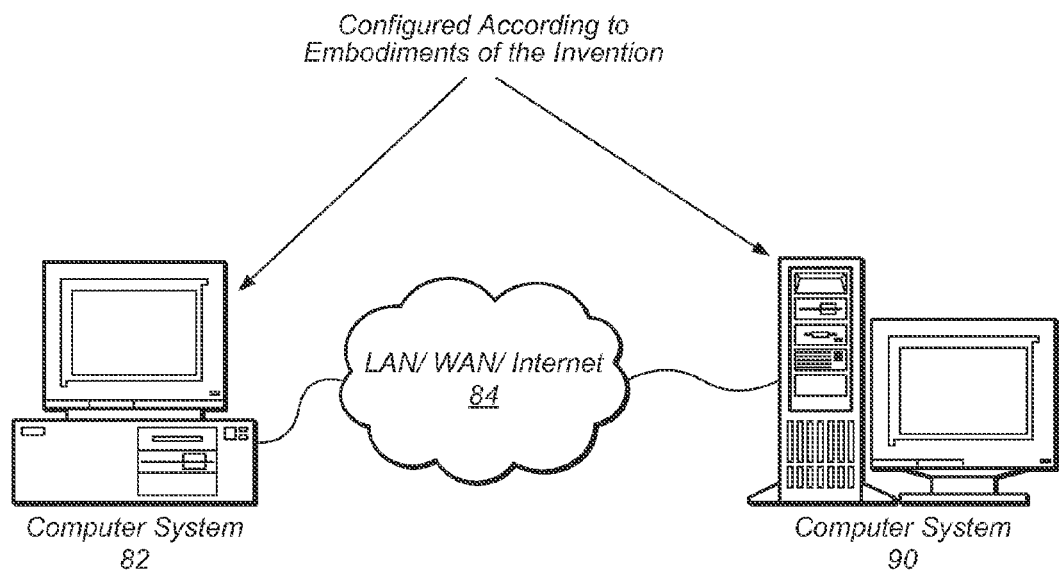
FIG. 2B illustrates a network system comprising two or more computer systems that may implement an embodiment of the present invention.

FIG. 2B—Computer Network

FIG. 2B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute programs in a distributed fashion utilizing embodiments disclosed herein. For example, computer 82 may execute a first portion of a program and computer system 90 may execute a second portion of the program. As another example, computer 82 may display the graphical user interface of a program and computer system 90 may execute the functional portion or main body of the program. In a further example, computers 82 and 90 may execute respective programs in a tightly coordinated manner, via embodiments of the techniques described herein.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the program execution techniques disclosed herein may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 3A:
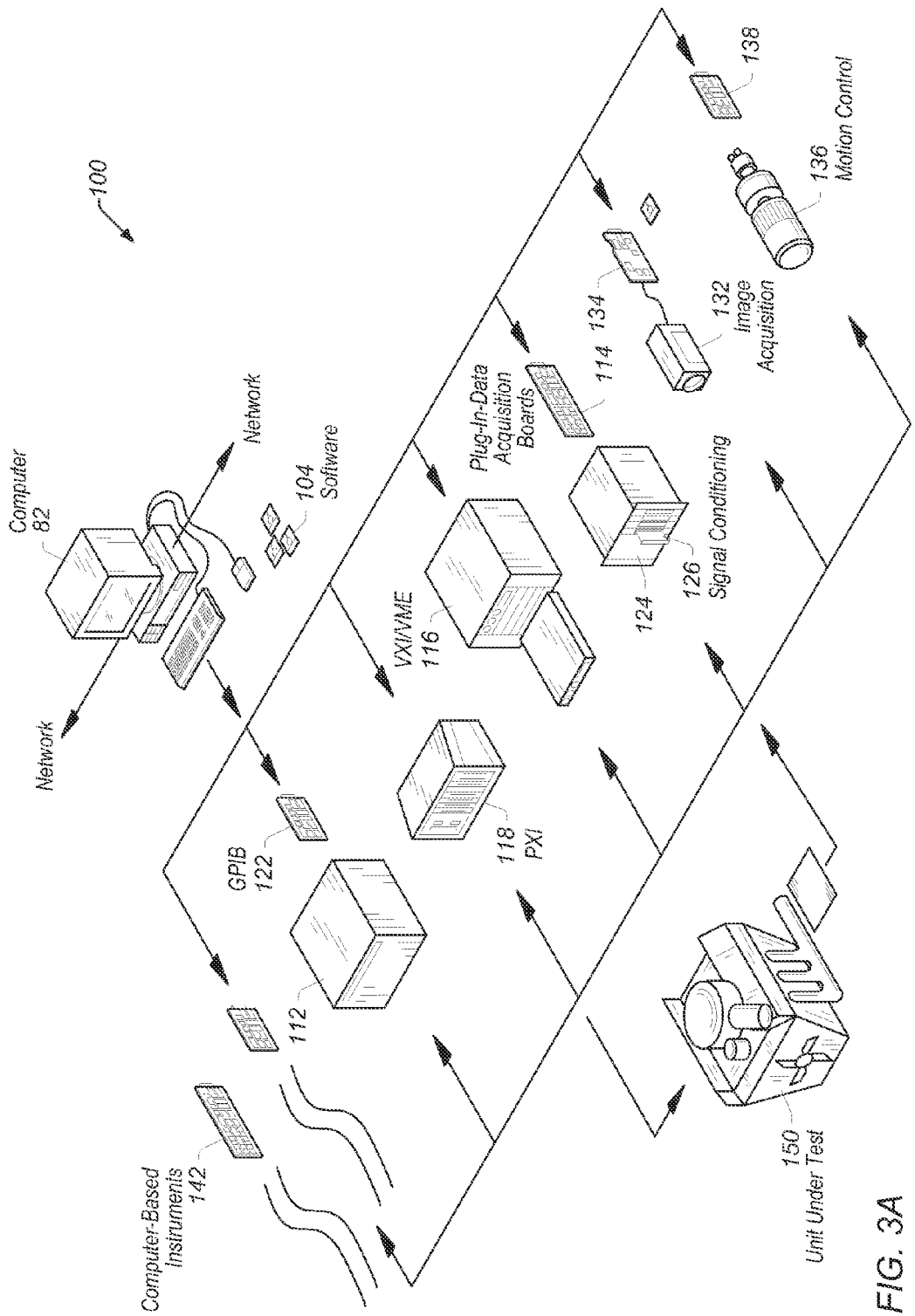
FIG. 3A illustrates an instrumentation control system according to one embodiment of the invention.

FIG. 3A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150 using embodiments of the techniques disclosed herein, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 3B:
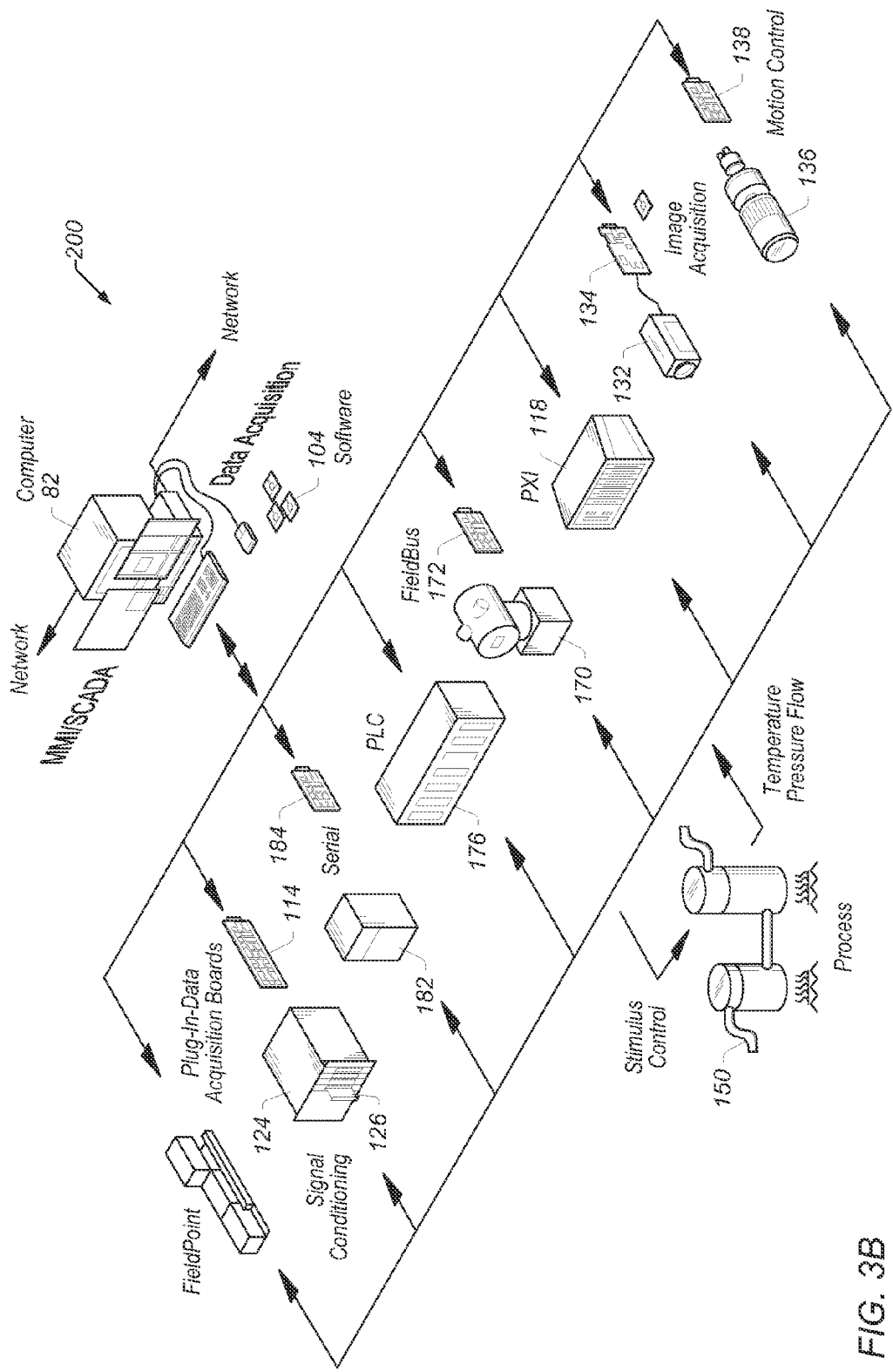
FIG. 3B illustrates an industrial automation system according to one embodiment of the invention.

FIG. 3B illustrates an exemplary industrial automation system 200 which may implement embodiments of the invention. The industrial automation system 200 is similar to the instrumentation or test and measurement system 100 shown in FIG. 3A. Elements which are similar or identical to elements in FIG. 3A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others, using embodiments of the techniques disclosed herein, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as the Fieldpoint system available from National Instruments, among other types of devices.

Figure 4A:
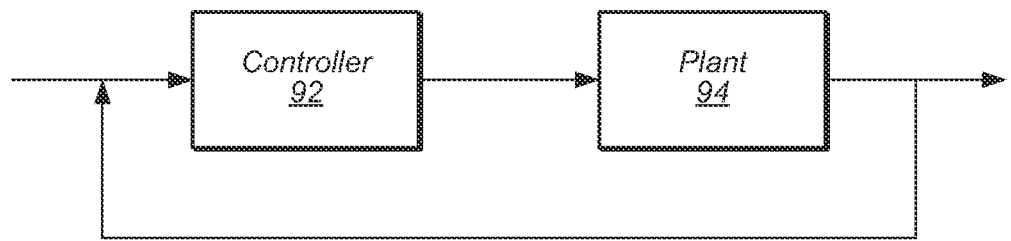
FIG. 4A is a high level block diagram of an exemplary system which may execute or utilize graphical programs.

FIG. 4A is a high level block diagram of an exemplary system which may execute programs via embodiments of the present technique. FIG. 4A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program that specifies or implements the functionality of one or both of the controller 92 and the plant 94. For example, a control engineer may use a modeling and simulation tool to create a model (program) of the plant 94 and/or to create the algorithm (program) for the controller 92, and may execute the model via embodiments of the techniques disclosed herein.

Figure 4B:
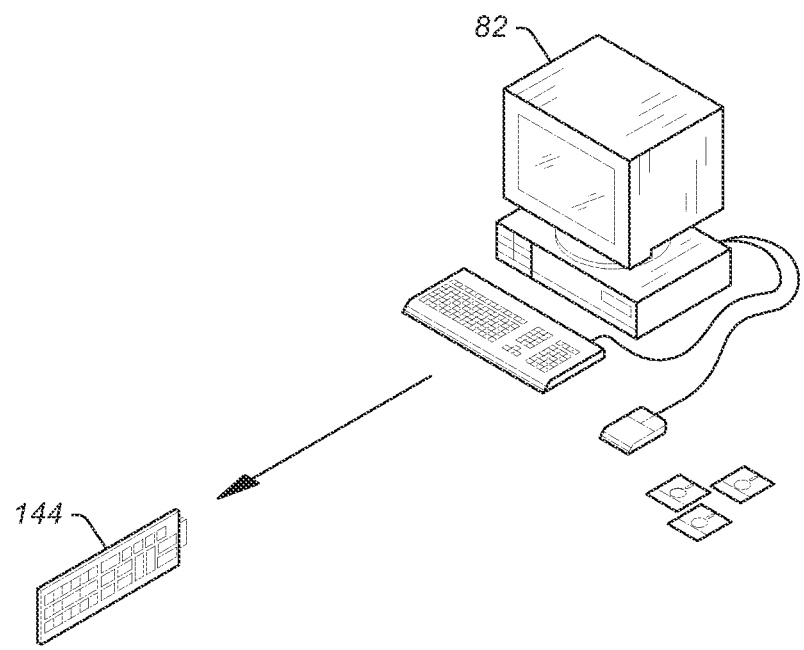
FIG. 4B illustrates an exemplary system which may perform control and/or simulation functions utilizing graphical programs.

FIG. 4B illustrates an exemplary system which may perform control and/or simulation functions. As shown, the controller 92 may be implemented by a computer system 82 or other device (e.g., including a processor and memory medium and/or including a programmable hardware element) that executes or implements a program. In a similar manner, the plant 94 may be implemented by a computer system or other device 144 (e.g., including a processor and memory medium and/or including a programmable hardware element) that executes or implements a program, or may be implemented in or as a real physical system, e.g., a car engine.

In one embodiment of the invention, one or more programs may be created and executed which are used in performing rapid control prototyping. Rapid Control Prototyping (RCP) generally refers to the process by which a user develops a control algorithm and quickly executes that algorithm on a target controller connected to a real system. The user may develop the control algorithm using a program, and the program may execute on the controller 92, e.g., on a computer system or other device, according to embodiments disclosed herein. The computer system 82 may be a platform that supports real time execution, e.g., a device including a processor that executes a real time operating system (RTOS), or a device including a programmable hardware element.

In one embodiment of the invention, one or more programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a program) is executed in real time to make the real controller 92 "believe" or operate as if it is connected to a real plant, e.g., a real engine.

In the embodiments of FIGS. 3A, 3B, and 4B above, one or more of the various devices may couple to each other over a network, such as the Internet. In one embodiment, the user operates to select a target device from a plurality of possible target devices for programming or configuration using a program. Thus the user may create a program on a computer and use (execute) the program on that computer or deploy the program to a target device (for remote execution on the target device) that is remotely located from the computer and coupled to the computer through a network. The program may be executed according to embodiments of the techniques disclosed herein.

Figure 5:
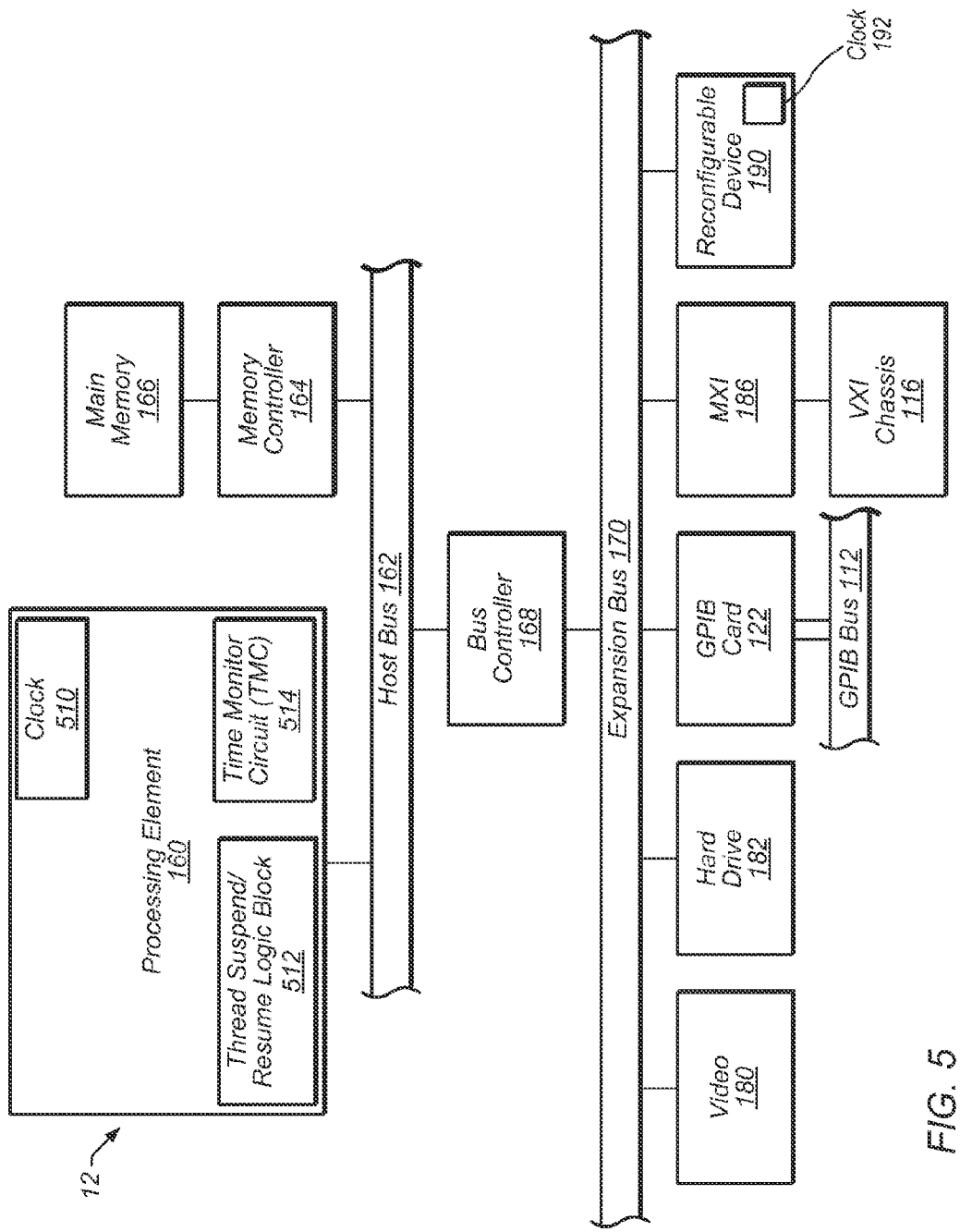
FIG. 5 is an exemplary block diagram of the computer systems of FIGS. 2A, 2B, 3A and 3B and 4B.

FIG. 5—Computer System Block Diagram

FIG. 5 is a block diagram representing one embodiment of the computer system 82 and/or 90 illustrated in FIGS. 2A and 2B, or computer system 82 shown in FIG. 3A or 3B. It is noted that any type of computer system configuration or architecture can be used as desired, and FIG. 5 illustrates a representative PC (personal computer) embodiment. It is also noted that the computer system may be a general purpose computer system, a computer implemented on a card installed in a chassis, or other types of embodiments. Elements of a computer not necessary to understand the present description have been omitted for simplicity.

The computer 12 may include a processing element 160, e.g., at least one central processing unit or CPU (processor), which is coupled to a processor or host bus 162. The CPU 160 may be any of various types, including an x86 processor, e.g., a Pentium class, a PowerPC processor, a CPU from the SPARC family of RISC processors, implemented in programmable hardware, e.g., an FPGA or ASIC, as well as others, but with additional features implementing embodiments of the techniques disclosed herein. For example, in one embodiment, the processing element may include a clock 510, a time monitor circuit 514, and a thread suspend/resume logic block 512, each discussed in more detail below. A memory medium, typically comprising RAM and referred to as main memory, 166 is coupled to the host bus 162 by means of memory controller 164. The main memory 166 may store programs configured to perform specified tasks. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 12 further comprises a video display subsystem 180 and hard drive 182 coupled to the expansion bus 170. The computer 12 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a program to the device 190 for execution of the program on the device 190. The deployed program may take the form of graphical program instructions or data structures, or may take the form of textual code (e.g., C code). Additionally, the device 190 may include clock 192.

Figure 6:
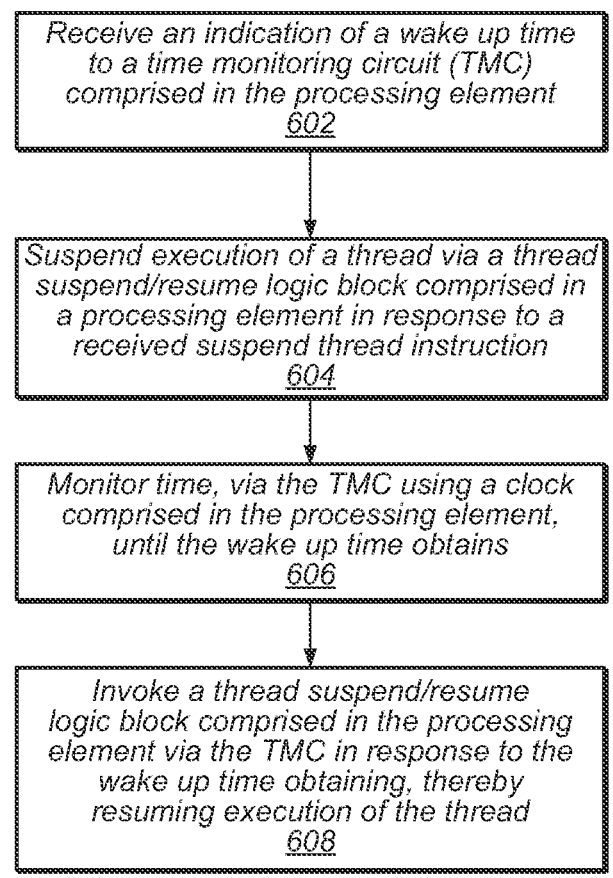
FIG. 6 is a flowchart diagram illustrating one embodiment of a method for managing thread execution via a timing circuit of a processing element, according to one embodiment.

FIG. 6—Flowchart of a Method for Managing Thread Execution via a Processor Time Monitoring Circuit FIG. 6 is a flowchart diagram illustrating one embodiment of a method for managing thread execution via a time monitoring circuit in a processing element. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 602, an indication of a wakeup time may be received to a time monitoring circuit (TMC) included in the processing element. Note that in some embodiments the indication of the wakeup time is an absolute time, e.g., (wake up the thread) at time t, while in other embodiments, the indication of the wakeup time is a relative time, e.g., (wake up the thread) after a specified time interval from the current time or a specified start time.

In 604, execution of a thread may be suspended via a thread suspend/resume logic block that may be included in a processing element in response to a received suspend thread instruction.

In 606, time may be monitored by the TMC using a clock that may be included in the processing element, until the wakeup time obtains. In other words, the TMC may utilize the clock of the processing element to determine when the wakeup time has arrived.

In 608, the thread suspend/resume logic block (which may be included in the processing element) may be invoked by the TMC in response to the wakeup time obtaining, thereby resuming execution of the thread. Note that no context switches are required using embodiments of the method of FIG. 6.

In some embodiments, the method may further include the TMC disciplining the clock via an external time source, which may require synchronization of the TMC to the time provided by the external time source, referred to herein as the "global time". To enable TMC to be synchronized to an external time source (such as IEEE 1588, GPS, etc.) at least two different implementations are contemplated, which are described in detail below in reference to FIGS. 10-13.

Figure 7:
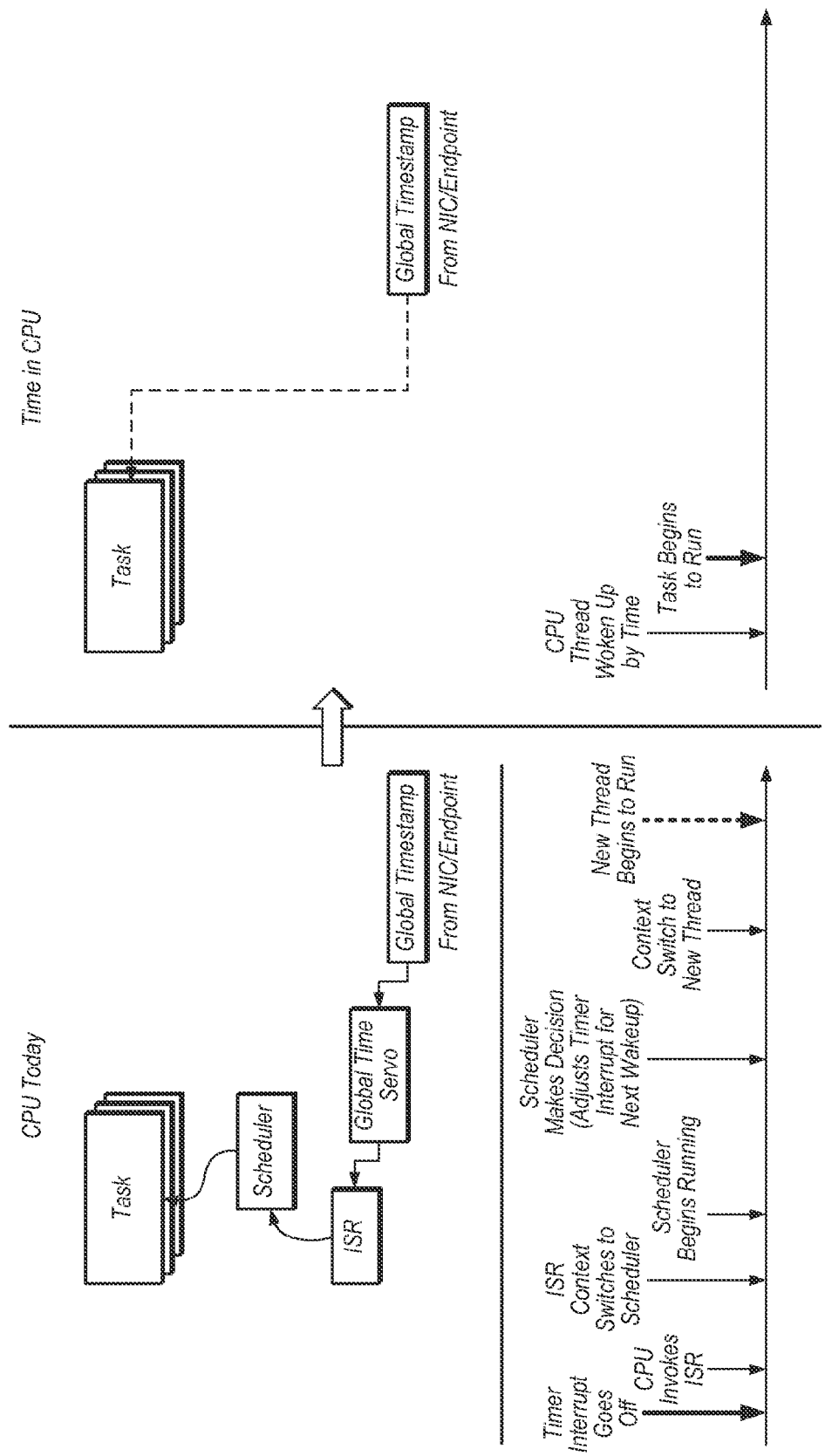
FIG. 7 illustrates a high level comparison between the prior art technique of FIG. 1 and an embodiment of the present technique.

FIG. 7 illustrates a comparison between the prior art approach of FIG. 1 (described above in the Background Section) and an embodiment of the approach of FIG. 6. As may be seen, whereas the prior art approach relying on interrupts involves at least two context switches, which is quite expensive computationally, the present approach avoids such context switches by being time based, e.g., relying on the internal time monitor circuit of the processing element to resume thread execution (of a task) based on a received global time from a peripheral device, e.g., a NIC (network interface controller) or endpoint device. Note that as used herein, "peripheral device" refers to a device that is coupled to the processing element, and further, that is memory mapped to the processing element.

Many current computer system processors include multiple cores, each possibly supporting multiple threads (e.g., hyper-threaded CPUs from Intel). This multi-threaded architecture makes it possible to make more optimal usage of the processor. Hyper-threading allows multiple instruction streams to execute concurrently in different execution resources in an attempt to better utilize those resources. Instructions such as Monitor-MWait, as described in Intel® 64 and IA-32-Architectures Software Developer Manual 325462, Vol. 3A, Section 8.10.4, allow a suspended thread to relinquish all resources for use by other active threads.

Some embodiments of the present technique build on the Monitor-MWait idea by introducing time based waiting at the processor instruction level, which has not heretofore been used, specifically, by adding the time monitor circuit (TMC) to the processing element (e.g., CPU core), which can monitor for time elapsed, and resume a previously suspended thread.

Thus, a time monitor circuit may be included in the processing element, and may resume execution threads based on time. In some embodiments, new (processor) instructions may be defined to configure and control the time monitor circuit. The approach disclosed herein builds at least partly on techniques disclosed in U.S. application Ser. No. 13/594,088 titled "Hardware Assisted Real-Time Scheduler Using Memory Monitoring", as well as U.S. Pat. No. 7,640,384, which describes a model that uses memory access to resume threads, both of which were incorporated by reference above.

Figure 8:
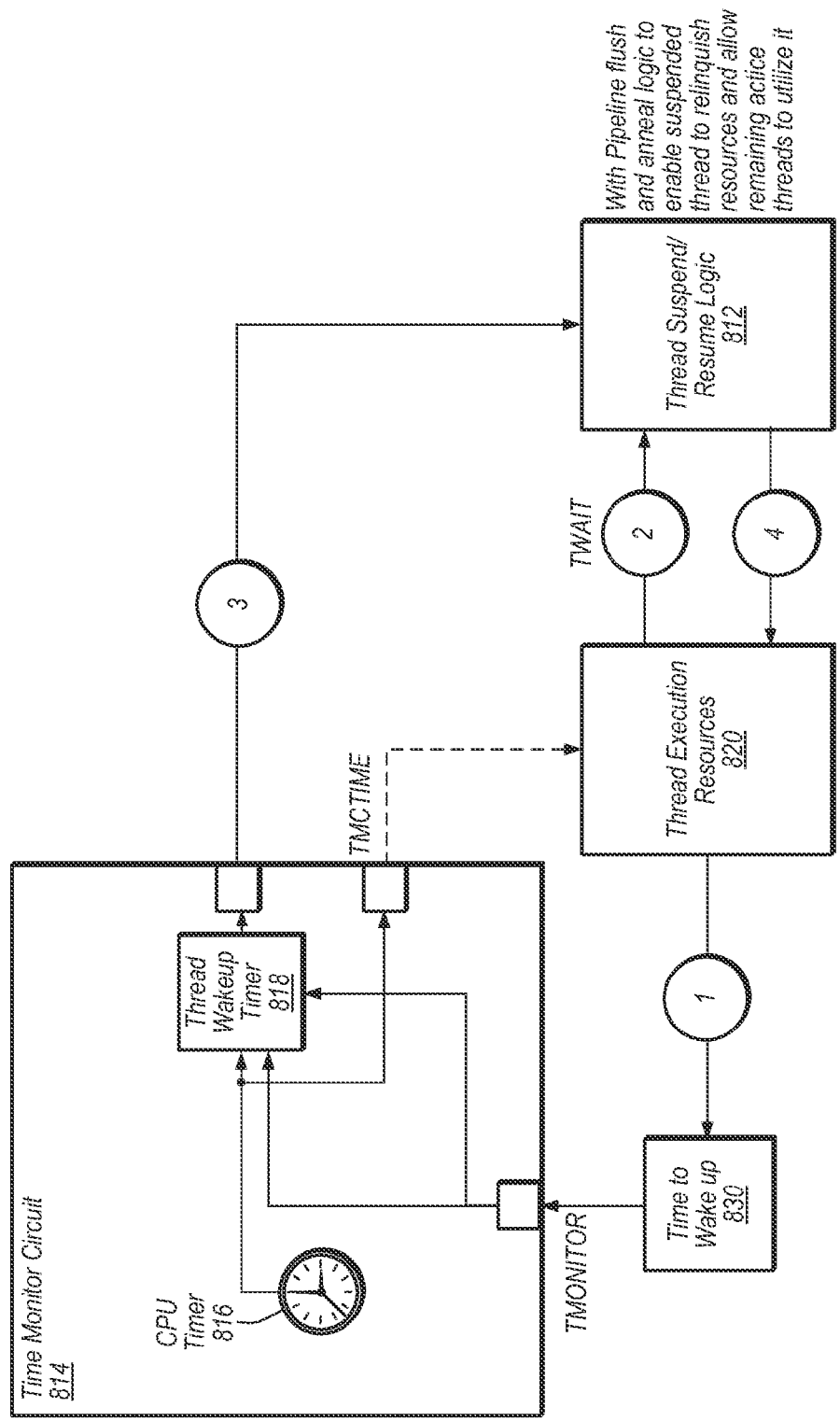
FIG. 8 illustrates a time monitor circuit and operation, according to one embodiment.

FIG. 8 illustrates a time monitor circuit, such as time monitor circuit 514 of FIG. 5, and its operation, according to one exemplary embodiment. The order of primary actions in the system of FIG. 8 is indicated by round numeric tags 1-4. In this exemplary embodiment, a CPU thread executing software, such as thread execution resources 820, calls an instruction TMONITOR (or equivalent) with an associated time value, to set the future time at which it wants to be awakened (resumed), e.g., a wakeup time, as indicated by the numeric tag 1 and time to wake up 830. The CPU thread then calls instruction TWAIT (or equivalent) to suspend itself, as indicated by numeric tag 2. Time monitor circuit 814 starts monitoring for the wakeup time via a time monitor, such as thread wakeup timer 818, which may compare the current time in the TMC 814 as provided by CPU timer 816 with the associated time value of TMONITOR and invokes thread suspend/resume logic block 812 (also included in the processing element/CPU), as indicated by numeric tag 3, to wake the suspended thread up when the wakeup time obtains, e.g., when monitored time has elapsed to the point that the wakeup time occurs, as indicated by numeric tag 4. This causes the thread to start executing again. Thus, the feature of the Monitor-MWait scheme of U.S. Pat. No. 7,640,384, mentioned above, may be leveraged whereby a thread, having called TWAIT (OR EQUIVALENT), relinquishes all resources for use by other threads in the CPU core that are active. A TMCTIME instruction (or equivalent) may allow software to read the current time in the TMC. Thus, in some embodiments, the same timer that interrupts the CPU in prior art approaches may be used to drive the TMC. As indicated above, the particular names and labels of the various components and instructions described herein are meant to be exemplary only, and it should be noted that any other names or labels may be used as desired.

Figure 9:
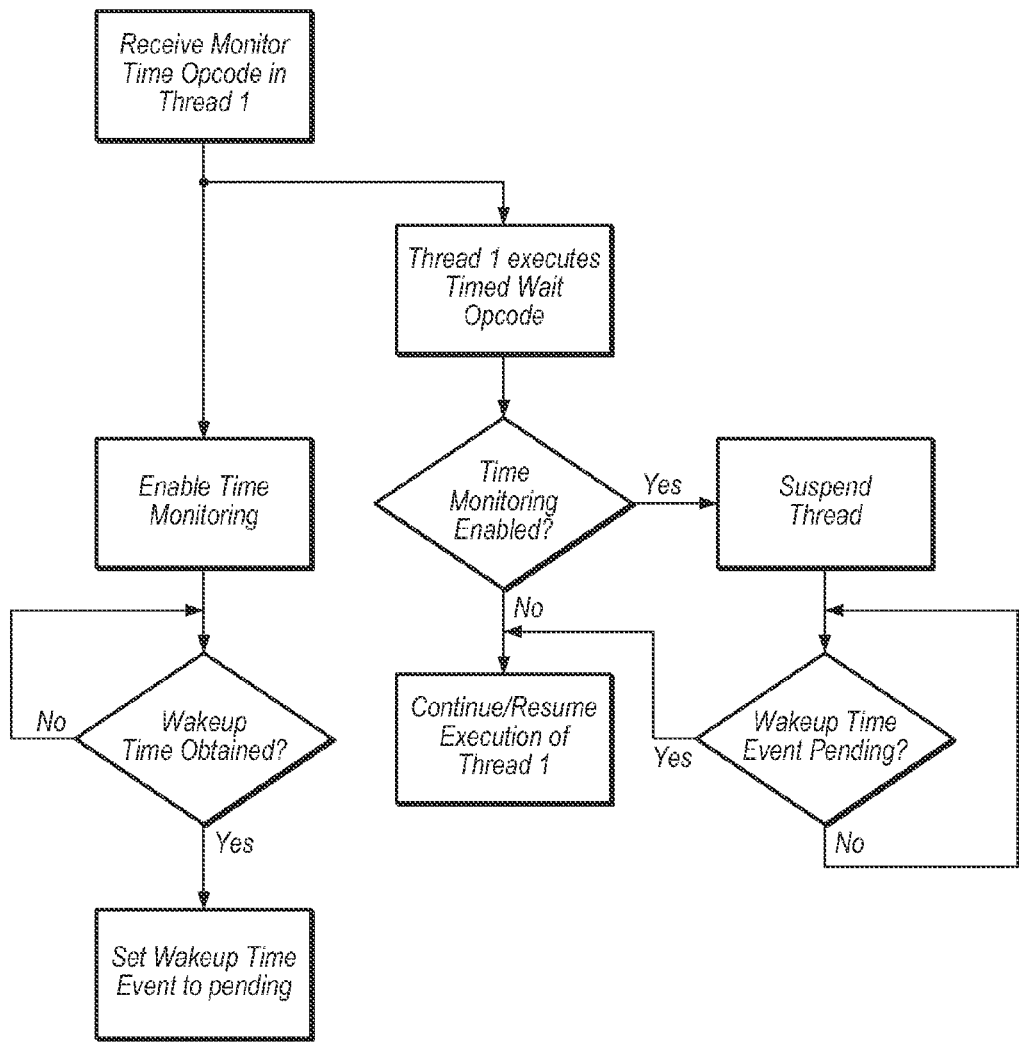
FIG. 9 flowcharts a more detailed embodiment of the method of FIG. 6.

FIG. 9 flowcharts a more detailed exemplary embodiment of the method of FIG. 6, illustrating an exemplary sequence of operations using the TMC. As may be seen, this sequence includes a first branch that sets the wakeup time for a thread (thread 1), monitors for its occurrence or expiration, and sets or triggers an event; and a second branch that monitors for the wakeup event, and resumes execution of the thread (thread 1) in response. The two branches may be performed at least somewhat concurrently, i.e., at least some portions of the two branches may be performed in parallel.

More specifically, in the embodiment shown, beginning at the top of the Figure, a monitor time opcode, e.g., TMONITOR (or equivalent) with an associated indication of the wakeup time (value), may be received in a thread, e.g., thread 1. Time monitoring may then be enabled. The TMC may then monitor time until the wakeup time obtains, and when the wakeup time obtains (e.g., has arrived or occurred), a wakeup time event may be created and/or set to "pending". As also shown, the thread (thread 1) may execute a timed wait opcode, and if time monitoring has been enabled, the thread may be suspended. The method may monitor for the wakeup time event, as indicated by the decision diamond labeled "wakeup time event pending?". Upon determining that the wakeup time event is pending, i.e., has occurred, the execution of the thread (thread 1) may be resumed. It should be noted that the various opcode names disclosed herein are exemplary only, and are not intended to limit the opcodes to any particular names.

In some embodiments, the TMC may be further configured to discipline the clock via an external time source, which may require synchronization of the TMC to the time provided by the external time source, referred to herein as the "global time". To enable TMC to be synchronized to an external time source (such as IEEE 1588, GPS, etc.) at least two implementations are contemplated, specifically, software based synchronization, and hardware based synchronization (or combinations thereof), described in detail below. In the first approach, to discipline the clock via an external time source, the TMC may be configured to discipline the clock using a global time provided by software.

Figure 10:
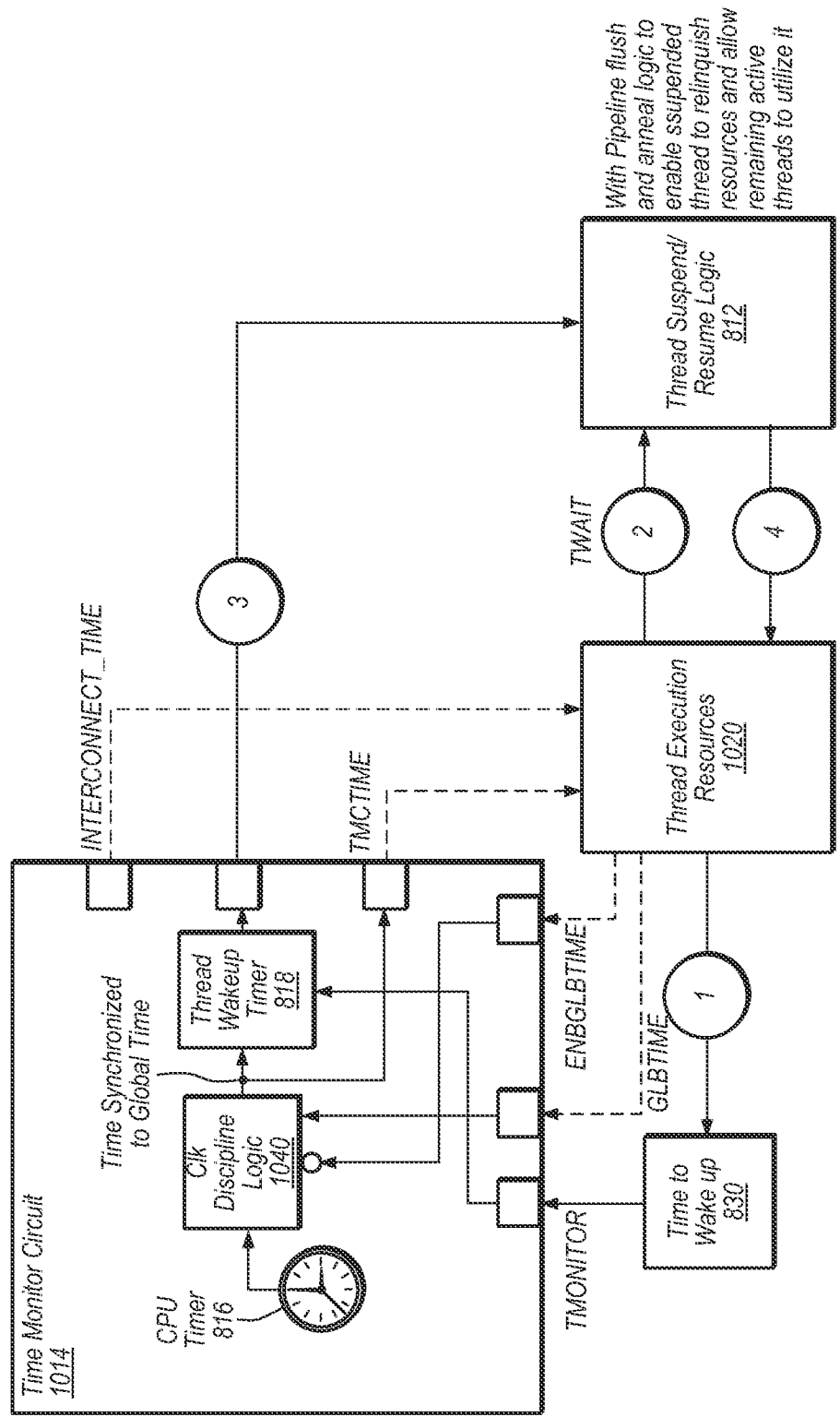
FIG. 10 illustrates synchronization of the time monitor circuit to a global time via software, according to one embodiment.

FIG. 10 illustrates synchronization of the time monitor circuit 1014 to a global time via software, according to one embodiment. In software based synchronization, software may periodically update global time on the TMC by reading from a peripheral device directly connected to the processing element. The peripheral device may provide its own local time as the global time, or may be a NIC that receives the global time from an external device coupled to the NIC, on the TMC. The TMC may use this time to discipline its own local time source (the clock on the processing element, e.g., CPU Timer 816 as shown in FIG. 10). Two more instructions may be added to the instruction set architecture (ISA), e.g., ENBGLBTIME (or equivalent), which enables the clock disciplining logic in the TMC 1014, and GLBTIME (or equivalent), which may be updated by the software periodically to provide global time. The order of primary actions in the system of FIG. 10 is indicated by round numeric tags 1-4.

As FIG. 10 shows, first, thread execution resources 1020 may establish the wakeup time, e.g., may provide an indication of the wakeup time to the TMC, as indicated by numeric tag 1, where the indication of the wakeup time may be provided with and via opcode TMONITOR (or equivalent) via time to wake up 830. As also indicated, the thread execution resources 1020 may optionally update the global time on the TMC via opcode GLBTIME (or equivalent), as indicated by the dashed line from the thread execution resources, as well as optionally enabling clock disciplining logic (clk discipline logic 1040) on the TMC via opcode ENBGLBTIME (or equivalent). The thread execution resources 1020 may further send opcode TWAIT (or equivalent) to the thread suspend/resume logic 812 to invoke suspension of the thread, as indicated by numeric tag 2.

In this embodiment, the clock discipline logic 1040 may discipline the clock of the time monitor circuit to global time, and this disciplined clock time may be monitored by the thread wakeup timer 818 (time monitor) to determine when the wakeup time obtains, and in response, may invoke the thread suspend/resume logic 812 to resume execution of the thread, as indicated by numeric tag 4. As also indicated, in this exemplary embodiment, the thread execution resources 1020 may receive or have access to the TMC's disciplined clock time via opcode TMCTIME (or equivalent), and may also receive or have access to the local reference time corresponding to the global time via opcode INTERCONNECT_TIME (or equivalent).

Note that, similar to the technique of U.S. Pat. No. 7,640,384, pipeline flush and anneal logic may be used to enable the suspended thread to relinquish resources and allow remaining active threads to utilize them.

In such software based synchronization, there may be latency issues due to the time it takes the software to provide the global time to the TMC. Accordingly, in some embodiments, the system may further include a local reference clock, connected directly to the processing element and to a peripheral device, where the peripheral device is configured to provide the global time to the processing element. As noted above, the peripheral device may be an external peripheral device that provides its own local time to the TMC as the global time, or alternatively, may be a NIC that receives the global time from another device, e.g., over a network, and provides the global time to the TMC.

In some embodiments, to provide the global time, the software may be executable to retrieve a local reference time from the local reference clock that corresponds to the global time via opcode INTERCONNECT_TIME (or equivalent), and provide the global time and the local reference time to the processing element. Accordingly, to discipline the clock, the TMC may be configured to retrieve a subsequent local reference time from the local reference clock, and adjust the global time based on a difference between the subsequent local reference time and the local reference time, e.g., the time retrieved via opcode INTERCONNECT_TIME (or equivalent) and corresponding to the global time, thereby compensating for latency due to the provision of the global time by the software.

In another embodiment, the software may latch a local reference time, e.g., the latched time, from the local reference clock that that corresponds to the global time and may subsequently provide the latched time and the global time to the processing element. Accordingly, to discipline the clock, the TMC may be configured to retrieve a subsequent local reference time from the local reference clock, and adjust the global time based on a difference between the subsequent local reference time and the latched time, thereby compensating for latency due to the provision of the global time by the software.

Figure 11:
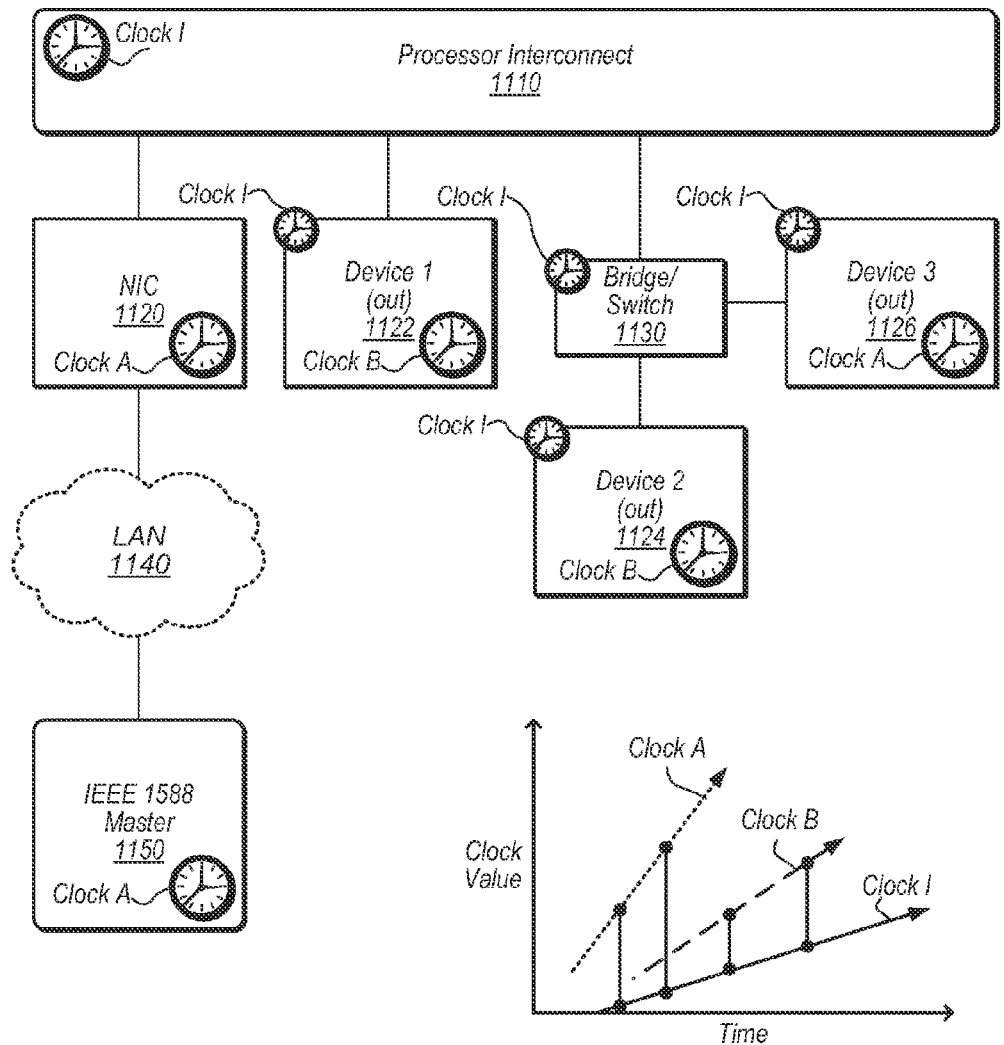
FIG. 11 illustrates use of a local reference time to synchronize the time monitor circuit to a global time via software, according to one embodiment.

FIG. 11 illustrates use of a local reference clock to synchronize the time monitor circuit to a global time via software, according to one embodiment. As shown, in this illustrative embodiment, various peripheral devices are connected to a processor interconnect, via which they may couple to the processing element, e.g., of FIG. 10. The peripherals include a NIC 1120 coupled to an IEEE 1588 master clock 1150 with clock A, and configured to receive time from this clock over a LAN 1140, although other networks may be used as desired. As also shown, the peripheral devices also include device 1 1122 with clock B, device 2 1124, coupled to the processor interconnect 1110 via a bridge/switch 1130, where device 2 1124 also includes clock B, and device 3 1126, also coupled to the processor interconnect 1110 via the bridge/switch 1130, where device 3 includes clock A.

The processor interconnect 1110 may include local reference clock I, which may be used to make the above-mentioned adjustments to discipline the TMC clock to global time in a manner that compensates for latency. The graph at the bottom of FIG. 11 illustrates respective differences between the local reference clock I and each of clocks A and B at different times, where, as may be seen, these differences may increase over time, and so such adjustments may be dynamic.

As mentioned above, an alternative to the above-described clock disciplining via software synchronization, the synchronization may be performed via a hardware signal. Thus, in some embodiments, the external time source may include an external hardware signal. In this approach, an external hardware signal may be provided to the processing element that includes both an epoch (reference time) and a clock. The epoch may be used to phase align the TMC in a distributed system.

Figure 12:
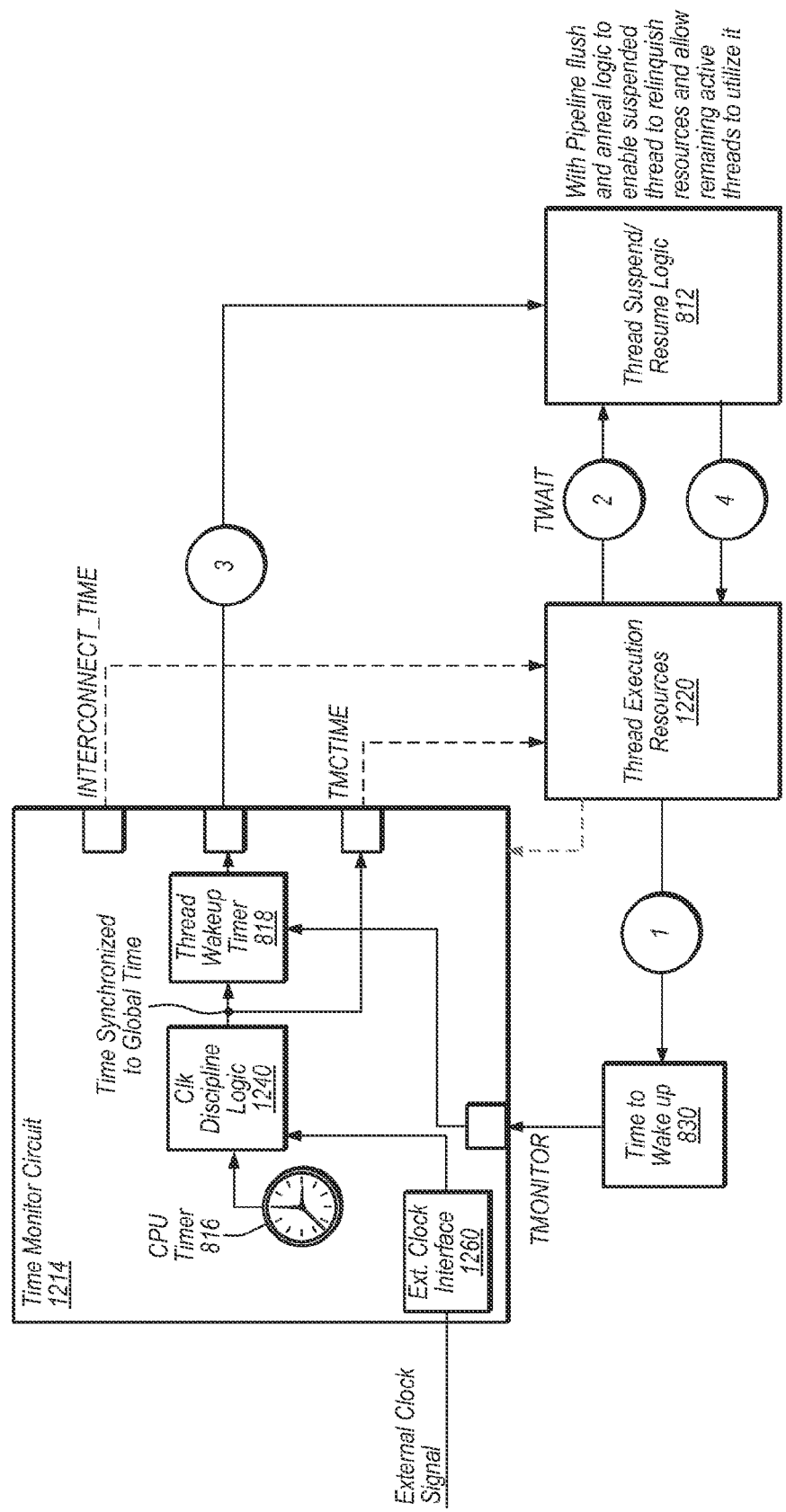
FIG. 12 illustrates synchronizing the time monitor circuit to a global time via a hardware signal, according to one embodiment.

FIG. 12 illustrates disciplining the local clock of the TMC 1214 to a global time via a hardware signal, according to one embodiment. First, thread execution resources 1220 may establish the wakeup time, e.g., may provide an indication of the wakeup time to the TMC, as indicated by numeric tag 1 and logic block time to wake up 830, where the indication of the wakeup time is provide with and via opcode TMONITOR (or equivalent). As also indicated, the thread execution resources 1220 may further send opcode TWAIT (or equivalent) to the thread suspend/resume logic 812 to invoke suspension of the thread, as indicated by numeric tag 2. Further, an external clock signal may be provided to the TMC 1214 via an external clock interface 1260. The external clock signal may include an epoch and a clock signal.

In this embodiment, the clock discipline logic 1240 may discipline the clock of the TMC to the external clock, where the epoch may be used to phase align the clock in a distributed system. This disciplined clock time may be monitored by the thread wakeup timer 818 (time monitor) to determine when the wakeup time obtains, and in response, may invoke the thread suspend/resume logic 812 to resume execution of the thread, as indicated by numeric tag 4. As also indicated, in this exemplary embodiment, the thread execution resources 1220 may receive or have access to the TMC's disciplined clock time via opcode TMCTIME (or equivalent), and may also receive or have access to the local reference time corresponding to the global time via opcode INTERCONNECT_TIME (or equivalent). As noted above, the opcode names used herein are meant to be exemplary only, and any other names may be used as desired.

Note that, in some embodiments where the external clock is coupled to TMC via a direct connection to the processing element, the external clock may exhibit no appreciable latency with regards to the local reference clock. However, in some other embodiments, some latency may be unavoidable, and thus such direct connection may operate to address latency issues, but may not remove all latencies. In other words, the direct connection between an external clock and the processing element may lessen, but not totally remove, the latency. However, the latency may be decreased to the point that for practical purposes it is removed, e.g., depending on the application.

Note also that, similar to the technique of U.S. Pat. No. 7,640,384, pipeline flush and anneal logic may be used to enable the suspended thread to relinquish resources and allow remaining active threads to utilize them.

Figure 13:
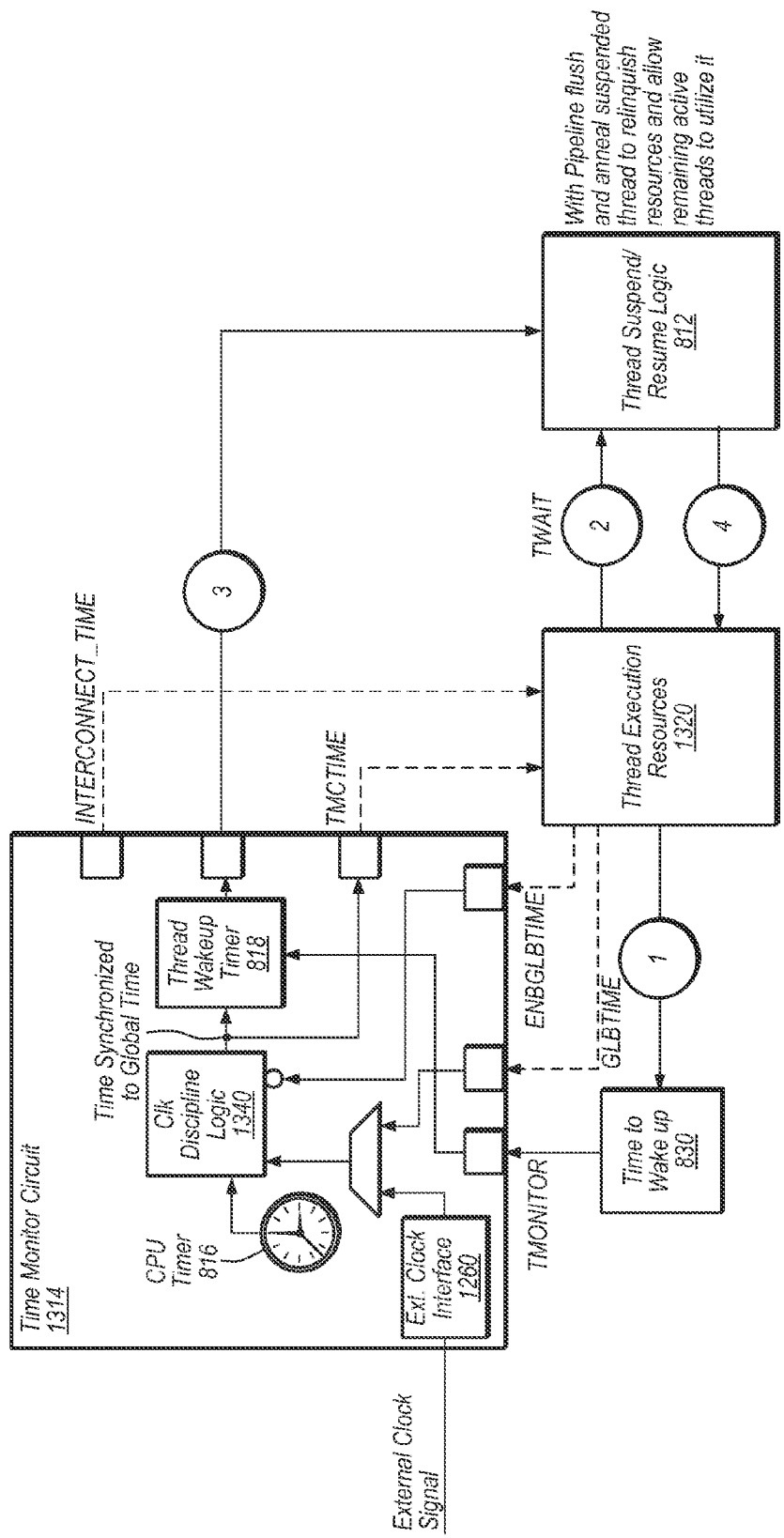
FIG. 13 illustrates a combination of the approaches of FIGS. 10 and 12, according to one embodiment.

FIG. 13 illustrates a combination of the approaches of FIGS. 10 and 12, according to one embodiment. As described above in reference to FIGS. 10 and 12, thread execution resources 1320 may establish the wakeup time, as indicated by numeric tag 1, where the indication of the wakeup time is provide with and via opcode TMONITOR (or equivalent) and logic block time to wake up 830. As also indicated, the thread execution resources 1320 may optionally update the global time on the TMC via opcode GLBTIME (or equivalent), as indicated by the dashed line from the thread execution resources 1320, as well as optionally enabling clock disciplining logic 1340 on the TMC 1314 via opcode ENBGLB-TIME (or equivalent). Additionally, the thread execution resources 1320 may further send opcode TWAIT (or equivalent) to the thread suspend/resume logic 812 to invoke suspension of the thread, as indicated by numeric tag 2. Further, an external clock signal may be provided to the TMC via an external clock interface 1260. The external clock signal may include an epoch and a clock signal.

In this embodiment, the TMC 1314 may include logic to allow the TMC 1314 to select between the external clock signal provided via the external clock interface 1260 and the global time provided via opcode GLBTIME (or equivalent). In some embodiments, this selection may be configurable via system BIOS software. In such embodiments, the system BIOS software may be configured with an option to use an external clock in place of the software clock via configuring registers of the processing element, such that upon system startup the processing element is configured to use an external clock instead of the software clock. In other words, the system default may be a software clock and the setting may only be changeable at system startup via the configuration of the processor element's registers. In other embodiments, the TMC 1314 may include a hardware switch for selection of the disciplining clock. If the external clock signal is selected, the clock discipline logic 1340 may discipline the clock of the TMC (CPU timer 816) to the external clock, where the epoch may be used to phase align the clock in a distributed system. Alternatively, if the GLBTIME signal (or equivalent) is selected to discipline the clock of the TMC (CPU timer 816), the clock discipline logic 1340 may discipline the clock of the time monitor circuit to global time. In both instances, the disciplined clock time may be monitored by the thread wakeup timer 818 (time monitor) to determine when the wakeup time obtains and in response, may invoke the thread suspend/resume logic 812 to resume execution of the thread, as indicated by numeric tag 4. As also indicated, in this exemplary embodiment, the thread execution resources 1320 may receive or have access to the TMC's disciplined clock time via opcode TMCTIME (or equivalent), and may also receive or have access to the local reference time corresponding to the global time via opcode INTERCONNECT_TIME (or equivalent).

As described above with reference to FIG. 10, in such software based synchronization, there may be latency issues due to the time it takes the software to provide the global time to the TMC. Accordingly, in some embodiments, the system may further include a local reference clock, e.g., INTERCONNECT_TIME (or equivalent) in the TMC, connected directly to the processing element and to a peripheral device, where the peripheral device is configured to provide the global time to the processing element where the peripheral device may be an external peripheral device that provides its own local time to the TMC as the global time, or alternatively, may be a NIC that receives the global time from another device, e.g., over a network, and provides the global time to the TMC.

Further, in some embodiments, to provide the global time, the software may be executable to retrieve a local reference time from the local reference clock that corresponds to the global time, and provide the global time and the local reference time to the processing element. Accordingly, to discipline the clock, the TMC may be configured to retrieve a subsequent local reference time from the local reference clock, and adjust the global time based on a difference between the subsequent local reference time and the local reference time, thereby compensating for latency due to the provision of the global time by the software.

Note that, when the external clock signal is selected and the external clock is coupled to TMC via a direct connection to the processing element, there will be no latency. Note also that, similar to the technique of U.S. Pat. No. 7,640,384, pipeline flush and anneal logic may be used to enable the suspended thread to relinquish resources and allow remaining active threads to utilize them.

Further Embodiments

The following describes further exemplary embodiments of the above-described techniques.

In certain embodiments, where the TMC may by configured to discipline the clock using a global time provided by software (see e.g., FIGS. 10 and 13 above), the system may further include a local reference clock. The local reference clock, e.g., clock I of FIG. 11, may be coupled to the processing element and to a peripheral device where the peripheral device may be configured to provide the global time, e.g., clock B of device 1 of FIG. 11, to the processing element. In some embodiments, the local reference clock may be connected directly to the processing element and to the peripheral device. In order to provide the global time, the software may be executable to retrieve a local reference time, e.g., INTERCONNECT_TIME (or equivalent) in the TMC, from the local reference clock that corresponds to the global time, and provide the global time and the local reference time to the processing element. Further, to discipline the clock, the TMC may be configured to retrieve a subsequent (i.e., updated) local reference time from the local reference clock, and adjust the global time based on a difference between the subsequent local reference time and the local reference time, thereby compensating for latency due to the provision of the global time by the software.

In some embodiments, where the TMC may by configured to discipline the clock using a global time provided by software (see e.g., FIGS. 10 and 13 above), the system may further include a local reference clock. The local reference clock, e.g., clock I of FIG. 11, may be coupled to the processing element and to a NIC where the NIC device may be configured to provide the global time via a local or wide area network, e.g., clock A of NIC 1 of FIG. 11, to the processing element. In some embodiments, the local reference clock may be connected directly to the processing element and to the peripheral device. The global time may be retrieved from a master time, such as IEEE 1588 Master, as shown in FIG. 11. In order to provide the global time, the software may be executable to retrieve a local reference time from the local reference clock that corresponds to the global time, and provide the global time and the local reference time to the processing element. Further, to discipline the clock, the TMC may be configured to retrieve a subsequent (i.e., updated) local reference time from the local reference clock, and adjust the global time based on a difference between the subsequent local reference time and the local reference time, thereby compensating for latency due to the provision of the global time by the software.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A system comprising:
 a processing element, comprising:
  a clock;
  a thread suspend/resume logic block, configured to suspend execution of a thread in response to a received suspend thread instruction; and
  a time monitor circuit (TMC); and
 a local reference clock, coupled to the processing element and to a peripheral device;
 wherein the TMC is configured to:
  receive an indication of a wakeup time;
  monitor time via the clock until the wakeup time obtains; and
  invoke the thread suspend/resume logic block to resume execution of the thread in response to the wakeup time obtaining;
 wherein the TMC is further configured to discipline the clock via an external time source, wherein to discipline the clock via an external time source, the TMC is configured to discipline the clock using a global time provided by software, wherein the peripheral device is configured to provide the global time to the processing element;
 wherein to provide the global time, the software is executable to retrieve a local reference time from the local reference clock that corresponds to the global time, and provide the global time and the local reference time to the processing element; and
 wherein to discipline the clock, the TMC is configured to retrieve a subsequent local reference time from the local reference clock, and adjust the global time based on a difference between the subsequent local reference time and the local reference time, thereby compensating for latency due to the provision of the global time by the software.

2. The system of claim 1, wherein the indication of the wakeup time is an absolute time.

3. The system of claim 1, wherein the indication of the wakeup time is a relative time.

4. The system of claim 1, wherein the local reference clock is connected directly to the processing element and the peripheral device.

5. The system of claim 1, wherein the external time source comprises an external hardware signal, wherein the external hardware signal comprises an epoch and a clock signal.

6. A method, comprising:
 receiving an indication of a wakeup time to a time monitoring circuit (TMC) comprised in a processing element;
 suspending execution of a thread via a thread suspend/resume logic block comprised in the processing element in response to a received suspend thread instruction;
 monitoring time, via the TMC using a clock comprised in the processing element, until the wakeup time obtains; and
 invoking the thread suspend/resume logic block via the TMC in response to the wakeup time obtaining, thereby resuming execution of the thread, the method further comprising:
  disciplining the clock, via the TMC via an external time source, wherein a global time provided by software is used to perform said disciplining;
  providing the global time to the processing element via a peripheral device, wherein a local reference clock is coupled to the processing element and to the peripheral device;
  retrieving, via software, a local reference time from the local reference clock that corresponds to the global time to perform said providing;
 wherein said disciplining comprises:
  retrieving, via the TMC, a subsequent local reference time from the local reference clock; and
  adjusting, via the TMC, the global time based on a difference between the subsequent local reference time and the local reference time, thereby compensating for latency due to the provision of the global time by software.

7. The method of claim 6, wherein the indication of the wakeup time is an absolute time.

8. The method of claim 6, wherein the indication of the wakeup time is a relative time.

9. The method of claim 6, wherein the local reference clock is connected directly to the processing element and the peripheral device.

10. The method of claim 6, wherein the external time source comprises an external hardware signal, wherein the external hardware signal comprises an epoch and a clock signal.

11. A system comprising:
 a processing element, comprising:
  a clock;
  a thread suspend/resume logic block, configured to suspend execution of a thread in response to a received suspend thread instruction; and
  a time monitor circuit (TMC); and
 a local reference clock, connected directly to the processing element and to a network interface controller (NIC);
 wherein the TMC is configured to:
  receive an indication of a wakeup time;
  monitor time via the clock until the wakeup time obtains; and
  invoke the thread suspend/resume logic block to resume execution of the thread in response to the wakeup time obtaining;
 wherein the TMC is further configured to discipline the clock via an external time source, wherein to discipline the clock via an external time source, the TMC is configured to discipline the clock using a global time provided by software,
 wherein to provide the global time, the software is executable to retrieve a local reference time from the local reference clock that corresponds to the global time, and provide the global time and the local reference time to the processing element;

wherein to discipline the clock, the TMC is configured to retrieve a subsequent local reference time from the local reference clock, and adjust the global time based on a difference between the subsequent local reference time and the local reference time, thereby compensating for latency due to the provision of the global time by the software.

12. The system of claim 11, wherein the external time source comprises an external hardware signal, wherein the external hardware signal comprises an epoch and a clock signal.

13. A method, comprising:
receiving an indication of a wakeup time to a time monitoring circuit (TMC) comprised in a processing element;
suspending execution of a thread via a thread suspend/resume logic block comprised in the processing element in response to a received suspend thread instruction;
monitoring time, via the TMC using a clock comprised in the processing element, until the wakeup time obtains; and
invoking the thread suspend/resume logic block via the TMC in response to the wakeup time obtaining, thereby resuming execution of the thread, the method further comprising:
disciplining the clock, via the TMC via an external time source, wherein a global time provided by software is used to perform said disciplining;
providing a global time to the processing element via a network interface controller (NIC), wherein a local reference clock is connected directly to the processing element and the NIC;
retrieving, via software, a local reference time from the local reference clock that corresponds to the global time to perform said providing;
wherein said disciplining comprises:
retrieving, via the TMC, a subsequent local reference time from the local reference clock; and
adjusting, via the TMC, the global time based on a difference between the subsequent local reference time and the local reference time, thereby compensating for latency due to the provision of the global time by software.

14. The method of claim 13, wherein the external time source comprises an external hardware signal, wherein the external hardware signal comprises an epoch and a clock signal.

* * * * *